Patented Feb. 24, 1953

2,629,739

UNITED STATES PATENT OFFICE 2,629,739

METHOD OF PRODUCING TETRYL

Gérard Desseigne, Paris, France, assignor to Etat Français (Ministere de la Defense Nationale) Represente par Monsieur l'Ingenieur en Chef, Directeur du Laboratoire Central des Poudres, Paris, France No Drawing. Application October 16, 1948, Serial No. 55,010. In France September 2, 1948

3 Claims. (Cl. 260—577)

My invention relates to the production of tetryl from dinitrochlorobenzene and dimethylamine or mixtures of the latter with methylamine.

It is well known that tetryl can be obtained by condensing methylamine with dinitrochlorobenzene and nitrating the dinitromethylaniline thus obtained (see G. Desseigne, "Mémorial des Poudres," XXVIII, 1938, p. 156).

The inventor of this procedure has now found that it is also possible to produce tetryl by reacting dimethylamine with dinitrochlorobenzene and then converting the dinitrodimethylaniline thus obtained into tetryl by nitration. The advantage with dinitrodimethylaniline (M. P. 86° C.) over dinitromethylaniline resides in that it can be washed in the molten state in order to remove the chlorides resulting from the reaction.

It is still more advantageous to start from a methylamine-dimethylamine mixture so selected that a low-melting dinitromethylaniline-dinitrodimethylaniline mixture is obtained of substantially eutectic composition, whereby washing the product in the molten state and decanting are made still easier.

A further advantage attending the use of dinitrodimethylaniline, or still better suitably selected dinitrodimethylaniline-dinitromethylaniline mixtures, resides in that they will dissolve readily in sulphuric acid to which they are added in the molten state for nitration purposes. Such solutions in sulphuric acid lend themselves particularly well to nitration in continuous operation. The yield of the nitration process remains unchanged irrespective of the percentage of the constituents. This result is rather surprising since it is well known that no satisfactory yields of tetryl are obtained by nitrating a mixture of methylaniline with dimethylaniline. It is rather necessary in the nitration of dimethylaniline that the latter should as much as possible be free from ethylaniline.

The nitration step may be carried out according to conventional methods, e. g. with the aid of a sulphuric-nitric acid mixture. The operation can be carried out more easily than the nitration of dimethylaniline since it is less exothermic, and as compared to the latter it enables to save considerable amounts of sulphuric acid and nitric acid.

The invention is also applicable to the production of tetryl homologues such as trinitrophenylethyl- or butylnitramine and hexanitrodiphenylethylene-dinitramine.

The following examples will serve to illustrate the invention without limiting it in any way. The parts are by weight.

*Example 1.*—50 parts of dinitrochlorobenzene and 100 parts of water are introduced in a closed vessel provided with stirring means. The whole is heated to 60° C. and gradually admixed with 39 parts of a 32% aqueous solution of dimethylamine and then with 33 parts of 30% soda lye. The mixture is heated to 90° C. in order to complete the reaction. The mothers are removed by decantation and the product is washed in the molten state with water at 90° C. There are obtained 51.7 parts of dinitrodimethylamine (M. P. 85.5° C.), the yield thus amounting to 99% of the theory.

The product thus obtained is dissolved in 150 parts of 96% sulphuric acid and the solution is introduced progressively into 375 parts of an acid mixture containing 45% of sulphuric acid, 33% of nitric acid and 22% of water, the mixture being kept at a temperature of 80–90° C. There are obtained 65.6 parts of pure tetryl (M. P. 129° C.), the yield thus amounting to 92.5% of the theory.

*Example 2.*—50 parts of dinitrochlorobenzene are condensed with 35 parts of an aqueous solution containing 4.8% of methylamine and 28% of dimethylamine, then with 33 parts of 30% soda lye. The mothers are removed by decantation and the product washed in the molten state; there are obtained 52 parts of a mixture which will melt entirely at temperatures below 80° C., the yield thus amounting to 99.8% of the theory.

The product obtained is poured in the molten state into 125 parts 96% sulphuric acid kept at a temperature below 65° C., after which the solution is admixed progressively to an acid mixture containing 38% of sulphuric acid, 42% of nitric acid and 22% of water, which mixture is kept at a temperature of 80–90° C. There are obtained 66.5 parts of pure tetryl (M. P. 129° C.), the yield thus amounting to 94% of the theory.

What I claim as my invention and desire to secure by Letters Patent is:

1. A method of producing tetryl which consists in treating an aqueous solution of dimethylamine, containing monomethylamine in admixture therewith, with dinitrochlorobenzene at a temperature of about 60° C., separating the dinitrodimethylaniline-dinitromethylaniline mixture thus formed, which is liquid at temperatures below 100° C., from the remainder of the reaction mixture by decantation, dissolving it in sulphuric acid, nitrating under conventional nitrating conditions the sulphuric acid solution thus obtained with a sulphuric-nitric acid mixture and separating the tetryl thus formed.

2. A method of producing tetryl which consists in treating an aqueous solution of raw dimethylamine and raw monomethylamine at a temperature of about 60° C. with dinitrochlorobenzene to form a liquid dinitrodimethylaniline-dinitromethylaniline eutectic mixture, separating the same by decantation, dissolving it in sulphuric acid, nitrating under conventional nitrating conditions the sulphuric acid solution thus obtained with a sulphuric-nitric acid mixture and separating the tetryl thus formed.

3. A method of producing tetryl which comprises mixing dinitrochlorobenzene with an aqueous solution containing dimethylamine and methylamine, and with aqueous 30% sodium hydroxide solution, in the proportions of 35 parts by weight of said first-named solution, 50 parts by weight of dinitrochlorobenzene and 33 parts by weight of said sodium hydroxide solution, reacting the mixture to form a liquid dinitrodimethylaniline-dinitromethylaniline eutectic mixture which is entirely fusible at temperatures below 80° C., separating said liquid eutectic mixture by decantation, subjecting said mixture to nitration under conventional nitrating conditions to form tetryl and recovering the thus formed tetryl.

GÉRARD DESSEIGNE.

REFERENCES CITED

The following references are of record in the file of this patent:

UNITED STATES PATENTS

| Number | Name | Date |
|---|---|---|
| 1,522,025 | Nolan et al. | Jan. 6, 1925 |
| 2,305,573 | Klipstein et al. | Dec. 15, 1942 |
| 2,357,830 | Jones | Sept. 12, 1944 |

FOREIGN PATENTS

| Number | Country | Date |
|---|---|---|
| 217,614 | Great Britain | June 20, 1924 |

OTHER REFERENCES

Desvergnes: "Mem. des Poudres," vol. 19, p. 223–249 (1922).

Desseigne: "Mem. des Poudres," vol. 28 (1938), pp. 157–160.